April 26, 1949. V. L. PRICE Re. 23,104

PERCUSSION TOOL

Original Filed Oct. 24, 1942 2 Sheets-Sheet 1

INVENTOR.
Vernon L. Price
BY Clayton and Lessagne
ATTORNEYS.

April 26, 1949. V. L. PRICE Re. 23,104

PERCUSSION TOOL

Original Filed Oct. 24, 1942 2 Sheets-Sheet 2

INVENTOR.
Vernon L. Price
BY Naylor and Larragne
ATTORNEYS

Reissued Apr. 26, 1949

Re. 23,104

UNITED STATES PATENT OFFICE 23,104

PERCUSSION TOOL

Vernon L. Price, San Jose, Calif.

Original No. 2,436,450, dated February 24, 1948, Serial No. 463,275, October 24, 1942. Application for reissue February 23, 1949, Serial No. 77,721

3 Claims. (Cl. 255—51)

This invention relates to percussion tools and more particularly to cradle or shell mounted type. In general, these devices utilize a fluid actuated percussive tool, within which a hammer piston is adapted to reciprocate, to drive a drill or other implements. Usually they are fixed on a frame and include a handle means for directing or guiding the assembly.

It is one of the principal objects of this invention to provide a percussion tool which will materially reduce, if not entirely eliminate, vibration usually transmitted to the operator through the handle or grip means.

It is an object of this invention to eliminate unnecessary vibration by providing a direct connection between handle or grip means and the tool to be driven whereby the vibration may be dissipated instead of transmitted to the operator.

Additionally, it is an object of the invention to provide a device in which a positive grip is maintained on the bit or other tool while utilizing a "floating" hammer means.

These and other objects of the invention will become more apparent as this specification proceeds and the novelty of the invention will be pointed out with the requisite degree of particularity in the appended claims.

In the drawings forming a part hereof wherein three preferred embodiments of the invention are shown:

Figure 1:
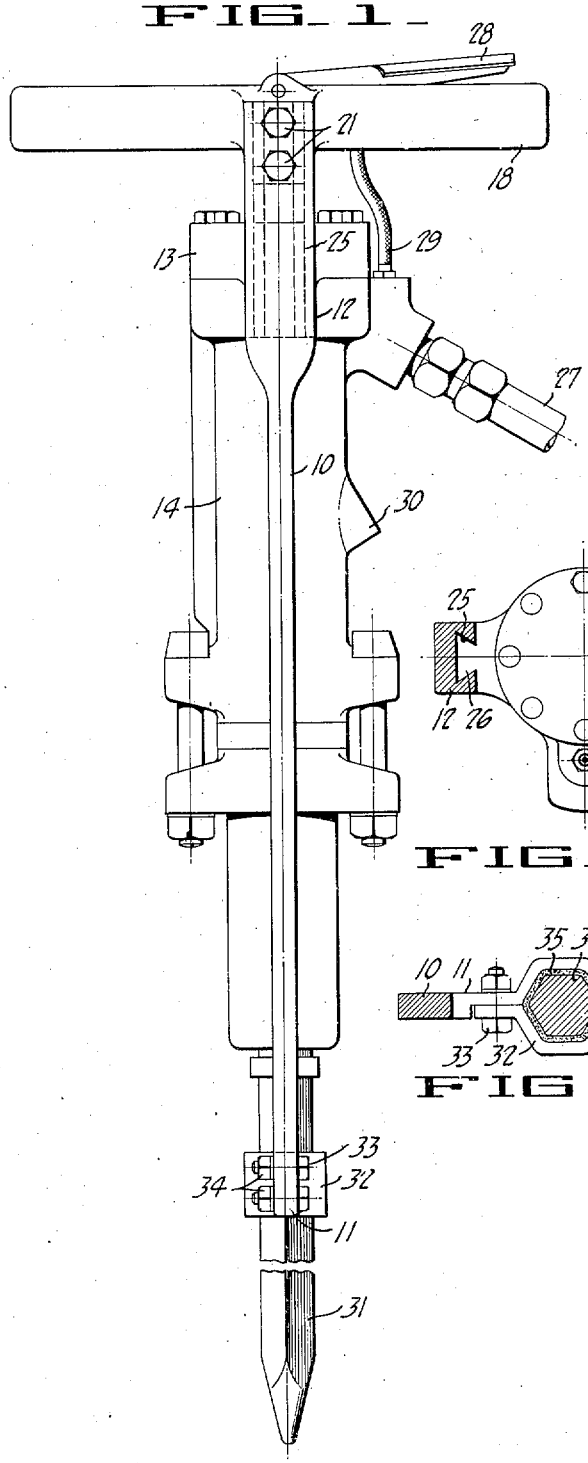
Figure 1 is a front elevation of a percussion tool.
Figure 2:
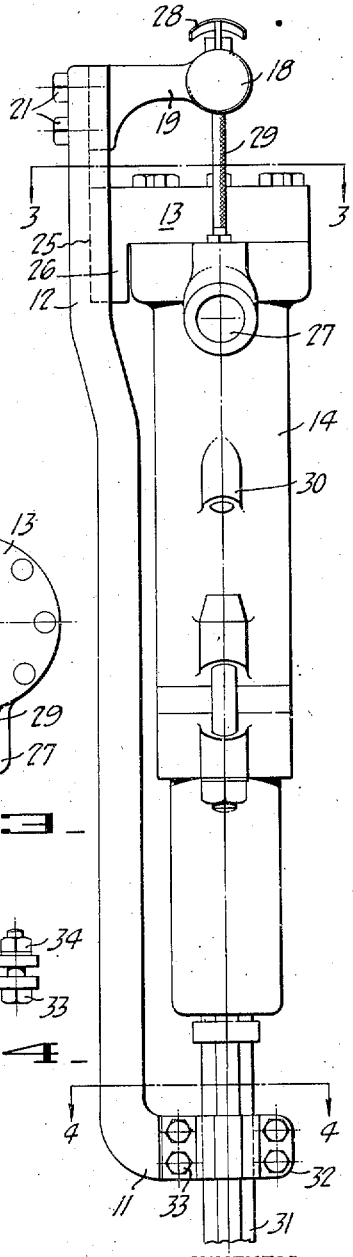
Figure 2 is a side elevation of the subject matter of Figure 1.
Figure 3:
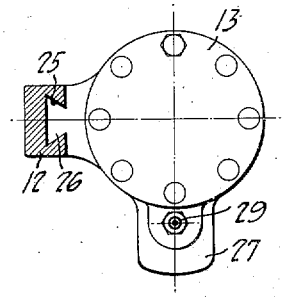
Figure 3 is a section along the line 3—3 of Figure 2.

In the case of the known and conventional percussion tools of the heavy duty type, such as are used in demolition and construction work and in mining operations, there has been a justifiable, universal complaint that use of the devices worked unnecessary physical hardship on the operators due to excessive vibrations transmitted through the entire structures. This has been due to the fact that heretofore the tools have included fixed connections between the handles and the percussive means, as a result of which the vibratory motion attendant upon each stroke of the air piston is communicated through the frame members to the handles and thence to the operator. The provision of spring connections between handle and air hammer has reduced in a minor degree only the unnecessary transmission of such vibrations.

The present invention contemplates the use of a frame member, having a handle on one end and a tool retainer on the other, as a stationary support for the fluid actuated percussive means, the connection between the two permitting vibratory reciprocation of the percussive means. In other words, the present invention proposes the gripping of the tool to be struck, as in the case of a hand held drill, rather than the gripping of the percussive member. Consequently, the only motion transmitted to the handle means will be the minute longitudinal movement of the tool under impact of the percussive member while reciprocal vibratory motion of the percussive member will be, insofar as the operator is concerned, dissipated in the connection between percussive member and its supporting frame.

Referring to Figures 1 to 4 of the drawings the numeral 10 designates a frame member in the form of a single rod bent inwardly at its bottom end, as at 11, to form a part of a tool retainer and bent outwardly at its upper end, as at 12, to accommodate the enlarged head 13 on the casing of a percussive member 14, with which it is connected. At its extreme upper end the frame 10 is provided with a handle 18 having a neck portion 19 to center the handle over the percussive member 14. The neck portion 19 may be connected to the upper end of frame rod 10 by means of the bolts 21 or it may be an integral part of the rod 10, as preferred.

The connection between the percussive member 14 and rod 10 is reciprocal in character and in the form shown in Figures 1 to 4, inclusive, the upper end 12 of rod 10 is flattened out for a portion of its length (see Figures 1 and 3) and provided with a longitudinally extending guideway 25 to slidably receive a flange 26 projecting laterally from head 13 on percussive member 14. This slidable connection permits dissipation of the extreme vibration of the percussive member 14 when actuated by the usual compressed air stream.

The percussive member 14 is of conventional design and includes an air intake line 27 communicating with its upper end, the supply of air being controlled by a throttle valve for which a grip lever 28 is provided in handle 18. The flexible connection 29 between lever 28 and the throttle valve (not shown) consists of a conventional cable-sheathed relatively stiff but bendable wire (see Fig. 5) of the type commonly employed for remote control of valves, such as the automobile choke control. Such flexible connection 29 is in keeping with the reciprocal connection between the percussive member 14 and frame rod 10, constituting an operating connection between said control lever 28 and the throttle valve in all positions to which the percussive hammer mechanism may slide on the frame rod 10. The percussive member 14 additionally has an exhaust port 30 and is chambered at its lower end in the usual way to receive a standard drill bit 31. It will be appreciated, of course, that the present invention is not concerned with the internal construction of the percussive member and inasmuch as these devices are well known in the art, no details thereof are deemed necessary in the drawings or this description.

Figure 4:
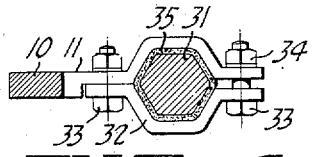
Figure 4 is a section along the line 4—4 of Figure 2.

The lower end 11 of rod 10, as stated, is bent inwardly to form a portion of a retainer for the bit 31. In Figure 4 the particular shape of that part of the retainer which is integral with rod 10 is shown to best advantage as conforming to the cross-section of one-half of the bit 31, while a detachable complemental piece 32 forms the other half of the retainer means. The detachable piece 32 is secured to the end portion 11 of rod 10 by conventional means such as the bolts 33 and nuts 34. To provide a positive grip on bit 31 a renewable bushing 35 of rubber or the like material is inserted between the bit 31 and the retainer means, namely, the end 11 of rod 10 and the detachable member 32.

Figure 5:
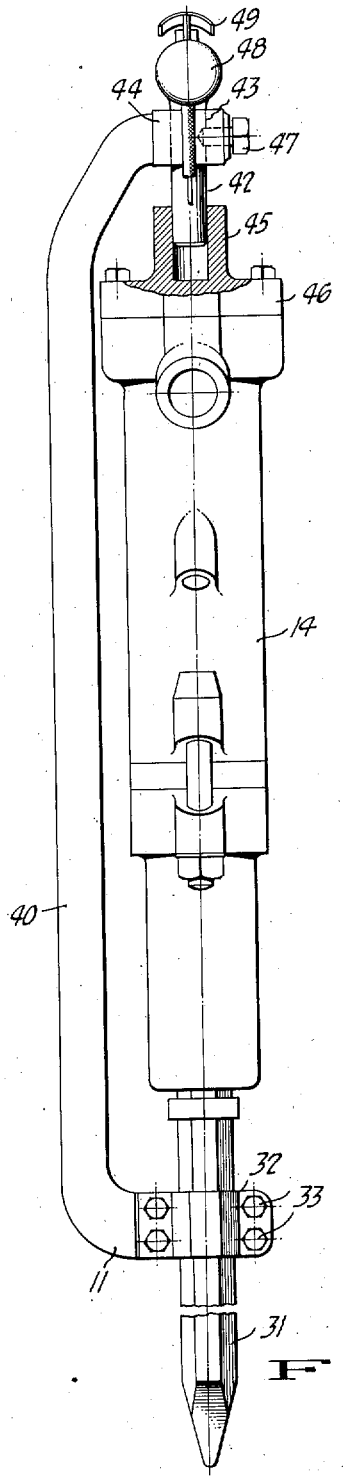
Figure 5 is a side elevation of a second percussion tool.

In the form shown in Figure 5 the percussive member 14 is supported for reciprocal vibratory movement on a frame 40 having substantially the same shape as rod 10 in Figure 1 and provided with the same drill bit retainer at its lower end including the detachable piece 32. In this form the connection between the percussive member 14 and frame 40 consists in a pin 42 projecting downwardly through a bore 43 in the inwardly bent upper end 44 of frame 40, which pin 42 is slidably received by a sleeve 45 formed integral with and projecting upwardly from head 46 of percussive member 14. Pin 42 may be adjusted relative to the sleeve 45 by means of a set screw 47 entering bore 43. A conventional handle 48 is formed on the upper end of pin 42 as a matter of simplifying the structure and the handle carries the usual throttle valve control lever 49.

Figure 6:
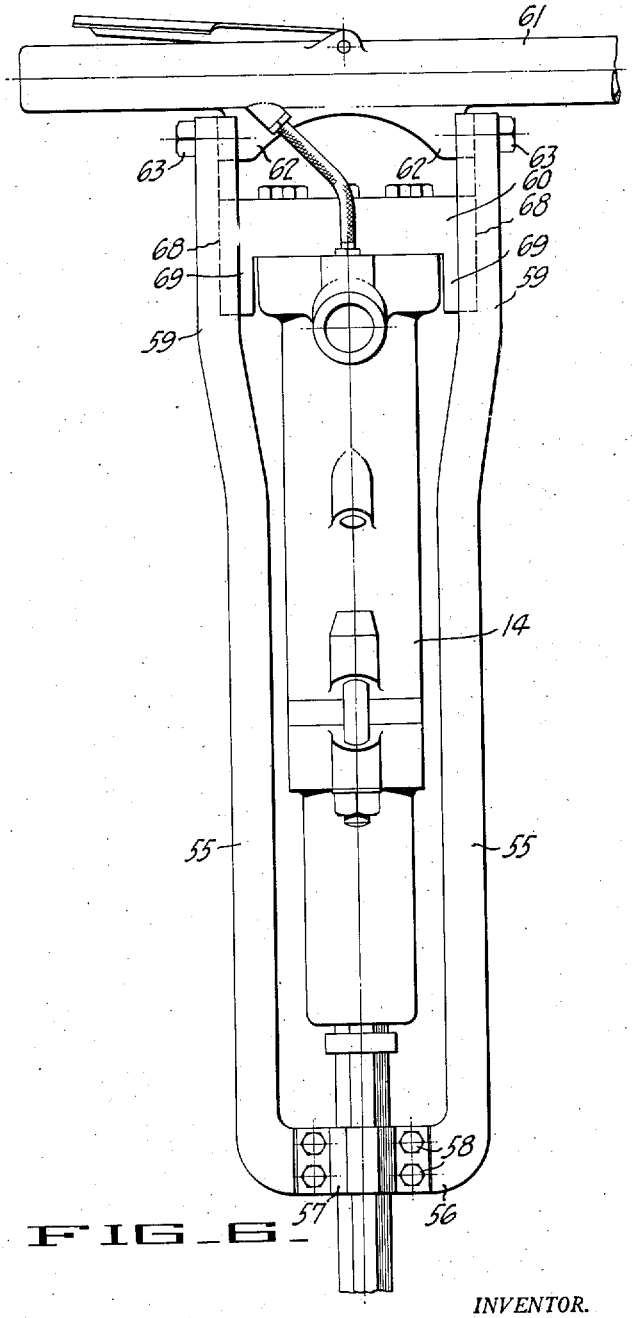
Figure 6 is a front elevation of a third embodiment of the invention.

In the form illustrated in Figure 6 the percussive member 14 is supported on a U-shaped frame member 55 the legs of which are deformed at the point of their connection to provide one-half of a bit retainer 56, the other half of which may be a detachable piece 57 and, like the piece 32 of Figure 4, secured thereto by bolts 58. The legs of the frame member 55 are parallel for the greater portion of their length but flared outwardly at their upper ends, as at 59, to accommodate the enlarged head 60 of percussive member 14. The frame assembly is completed by a cross handle 61 having lugs 62 by which it is attached to the upper ends of the frame legs through the medium of cap screws 63. The slidable connection between percussive member 14 and frame 55 in the device of Figure 6 comprises guideways 68 in the upper ends of the two legs of the frame receiving oppositely projecting flanges 69 on head 60.

In the three forms of the device shown in the drawings and described herein, it will be appreciated that the connections between the handle, frame and drill bit are rigid while the percussive member has a "floating" connection to the frame member. In this way the vibratory motion of the percussive member is dissipated in the sliding connection of hammer and frame and the only motion transmitted from the percussive member to the bit, and hence to the frame and handle assembly, will be the repeated impact of the percussive member on the drill. Such construction will not only avoid constant personal discomforture to the operator but will provide a more positive control of the bit or other tool and enable the operator to operate the same with increased efficiency.

While I have shown and described but three forms of the invention it will be appreciated that the principles thereof may be incorporated in other devices, and I therefore desire full protection within the spirit and scope of the appended claims.

The invention claimed is:

1. A percussion tool of the shell mounted type comprising a frame member, a handle on the upper end of the frame member, a member projecting downwardly from the handle portion of the frame, a positive grip tool retainer means carried by the lower end of the frame, a percussive means supported on a tool gripped by the retainer means, an upwardly projecting sleeve member on the percussive means to receive the member projecting downwardly from the handle portion of the frame.

2. A percussion tool comprising a frame, a handle on said frame, a tool retainer on said frame, percussive hammer mechanism slidably supported on said frame for percussive contact with a tool retained by said tool retainer; said percussive hammer mechanism including a throttle valve, a throttle valve control member carried by said handle, and a flexible connection between said control member and said throttle valve.

3. A percussion tool comprising a frame, a handle on said frame, a tool retainer on said frame, percussive hammer mechanism slidably supported on said frame for percussive contact with a tool retained by said tool retainer; said percussive hammer mechanism including a throttle valve, a throttle valve control member carried by said handle, and means constituting an operating connection between said control member and said throttle valve in all positions to which said percussive hammer mechanism may slide on said frame.

VERNON L. PRICE.

REFERENCES CITED

The following references are of record in the file of this patent:

UNITED STATES PATENTS

| Number | Name | Date |
|---|---|---|
| 910,560 | Mauss | Jan. 26, 1909 |
| 1,511,566 | Kollock | Oct. 14, 1924 |
| 2,270,929 | Bugg | Jan. 27, 1942 |